(12) United States Patent
Ito (10) Patent No.: US 9,157,386 B2
(45) Date of Patent: Oct. 13, 2015

(54) VEHICLE TRAVEL CONTROL DEVICE

(75) Inventor: Koji Ito, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 13/821,828

(22) PCT Filed: Sep. 14, 2010

(86) PCT No.: PCT/JP2010/065816
§ 371 (c)(1),
(2), (4) Date: Mar. 8, 2013

(87) PCT Pub. No.: WO2012/035614
PCT Pub. Date: Mar. 22, 2012

(65) Prior Publication Data
US 2013/0166153 A1  Jun. 27, 2013

(51) Int. Cl.
*F02D 29/02* (2006.01)
*G06F 17/00* (2006.01)
*F01N 3/00* (2006.01)
*B60R 21/013* (2006.01)

(52) U.S. Cl.
CPC .............. *F02D 29/02* (2013.01); *B60R 21/013* (2013.01); *F01N 3/00* (2013.01); *G06F 17/00* (2013.01)

(58) Field of Classification Search
CPC ......... F02D 45/00; F02D 29/02; G06F 19/00; G06F 17/00; F01N 3/00; B60R 21/013
USPC .......................................................... 701/45
See application file for complete search history.

(56) References Cited

U.S. PATENT DOCUMENTS

| | | | | |
|---|---|---|---|---|
| 6,435,294 | B1* | 8/2002 | Hara et al. ................. | 180/65.25 |
| 7,969,040 | B2* | 6/2011 | Conen et al. ................... | 307/9.1 |
| 8,234,029 | B2* | 7/2012 | Ando .............................. | 701/22 |
| 8,438,837 | B2* | 5/2013 | Hermansson et al. .......... | 60/286 |
| 2009/0271087 | A1 | 10/2009 | Motonaga | |
| 2010/0010723 | A1* | 1/2010 | Taki et al. ...................... | 701/102 |
| 2010/0145562 | A1* | 6/2010 | Moran ............................. | 701/22 |
| 2010/0282532 | A1* | 11/2010 | Falkenstein .............. | 180/65.265 |

FOREIGN PATENT DOCUMENTS

| | | |
|---|---|---|
| CN | 101489836 A | 7/2009 |
| JP | A-08-268120 | 10/1996 |
| JP | A-11-257118 | 9/1999 |
| JP | A-2002-213269 | 7/2002 |
| JP | A-2003-278575 | 10/2003 |
| JP | A-2005-030400 | 2/2005 |
| JP | A-2005-212595 | 8/2005 |
| JP | A-2006-009750 | 1/2006 |
| JP | A-2008-121583 | 5/2008 |
| JP | A-2008-143483 | 6/2008 |
| WO | 2008/059347 A2 | 5/2008 |

* cited by examiner

*Primary Examiner* — Fadey Jabr
*Assistant Examiner* — Courtney Heinle
(74) *Attorney, Agent, or Firm* — Oliff PLC (57) ABSTRACT

To more reliably realize both improvement in fuel economy at the time of travelling of a vehicle and maintenance operation, a vehicle travel control for performing control at the time of travelling of the vehicle starts an engine when activation of an actuator of a pre-crash safety system is predicted when an engine is stopped causing a vehicle, which travels by power generated by the engine, to travel through inertia in an aim of reducing fuel consumption amount. Power is thus generated in an alternator arranged in the engine, so that supply amount of electricity can be increased.

12 Claims, 6 Drawing Sheets

VEHICLE TRAVEL CONTROL DEVICE

FIELD

The present invention relates to a vehicle travel control device.

BACKGROUND

In vehicles of recent years, a control technique of stopping the engine to cause the vehicle to travel through inertia when a torque request is not made by a driver at the time of travelling of the vehicle is being developed in an aim of improving fuel economy, reducing amount of exhaust gas emission, and the like. At the time of inertia travelling, power generation by an alternator is stopped, so that power supply is carried out only with the discharging of the battery. In this case, the supply amount of electricity to a device that is activated with electricity may become insufficient depending on the state of the battery. Thus, a technique that resolves the insufficiency of power supplying amount at the time of inertia travelling is being proposed.

For example, in a method of operating an internal combustion described in patent literature 1, the engine is stopped and the inertia travelling is carried out if the torque request is not made by the driver and an activation prepared state of a system of the portion related to the safety of the vehicle is realized. In a state the inertia travelling is being carried out, the engine is started to supply power if an electric or an electro-hydraulic steering assist device or a brake device that is electrically activated or assisted is not activating normally, or if the energy remaining in a power supply circuit that can activate such devices becomes poor. Thus, the power supplying amount can be ensured even if the power supplying amount to the device that is activated with electricity becomes insufficient, and the inertia travelling can be carried out without destructing the safety.

CITATION LIST

Patent Literature

Patent Literature 1: Japanese Patent Application Laid-open No. 2005-30400

SUMMARY

Technical Problem

In vehicles of recent years, a control device for carrying out maintenance operation such as reducing the possibility of collision, protecting passengers of the vehicle, and the like if there is a possibility of colliding with the leading vehicle, for example, at the time of travelling of the vehicle is being developed to enhance the safety at the time of travelling. Many of such devices are activated by electricity, and thus if it is difficult to appropriately activate the device with the power of the battery under a situation of activating the device for carrying out the maintenance operation at the time of inertia travelling of the vehicle, the engine needs to be started to supply power, similar to the method of operating the internal combustion described in patent literature 1.

However, in such device for carrying out the maintenance operation, the power consumption amount greatly varies according to the device to activate and the situation at time of activation. In this case, sufficient power for appropriately activating the device for carrying out the maintenance operation needs to be ensured while carrying out inertia travelling in view of the possibility of power shortage.

In light of the foregoing, it is an object of the present invention to provide a vehicle travel control device capable of more reliably satisfying both improvement of fuel economy at the time of travelling of the vehicle and maintenance operation.

Solution to Problem

In order to solve the above mentioned problem and achieve the object, in a vehicle travel control device according to the present invention, when stopping a power source and causing a vehicle, which travels by power generated by the power source, to travel through inertia, the power source is started when an activation of a vehicle maintenance device is predicted.

Further, in order to solve the above mentioned problem and achieve the object, in a vehicle travel control device according to the present invention, when an activation of a vehicle maintenance device is predicted during travelling of a vehicle, which travels by power generated by a power source, the power source is prohibited from being stopped to cause the vehicle to travel through inertia.

Further, in order to solve the above mentioned problem and achieve the object, in a vehicle travel control device according to the present invention, when a vehicle maintenance device is activated when stopping a power source and causing a vehicle, which travels by power generated by the power source, to travel through inertia, the power source is started before the vehicle maintenance device is activated.

Further, in order to solve the above mentioned problem and achieve the object, in a vehicle travel control device according to the present invention, when a vehicle maintenance device is activated during travelling of a vehicle, which travels by power generated by the power source, the power source is prohibited from being stopped to cause the vehicle to travel through inertia before the vehicle maintenance device is activated.

Further, in the vehicle travel control device, it is preferable that the power source provides a power generation device configured to generate power at the time of activation of the power source, and when starting the power source at the time of activation of the vehicle maintenance device, rotation number of the power source is raised to preferably increase power generation amount in the power generating device.

Further, in the vehicle travel control device, it is preferable that the vehicle maintenance device is a passenger protecting device capable of protecting passengers of the vehicle when the vehicle has a possibility of colliding with an obstacle.

Further, in the vehicle travel control device, it is preferable that the vehicle maintenance device is a safety travel control device configured to stabilize travel state at the time of travelling of the vehicle.

Further, in the vehicle travel control device, it is preferable that the vehicle maintenance device is a purifying means heating device configured to heat a purifying means that purifies exhaust gas discharged at the time of operation of the power source.

Advantageous Effects of Invention

A vehicle travel control device according to the present invention is capable of more reliably satisfying both improvement of fuel economy at the time of travelling of the vehicle and maintenance operation.

DESCRIPTION OF EMBODIMENTS

Embodiments of a vehicle travel control device according to the present invention will be hereinafter described in detail based on the drawings. It should be noted that the present invention is not limited by such embodiments. The configuring elements in the following embodiments include easy elements that can be replaced by those skilled in the art, or substantially the same elements.

First Embodiment

Figure 1:
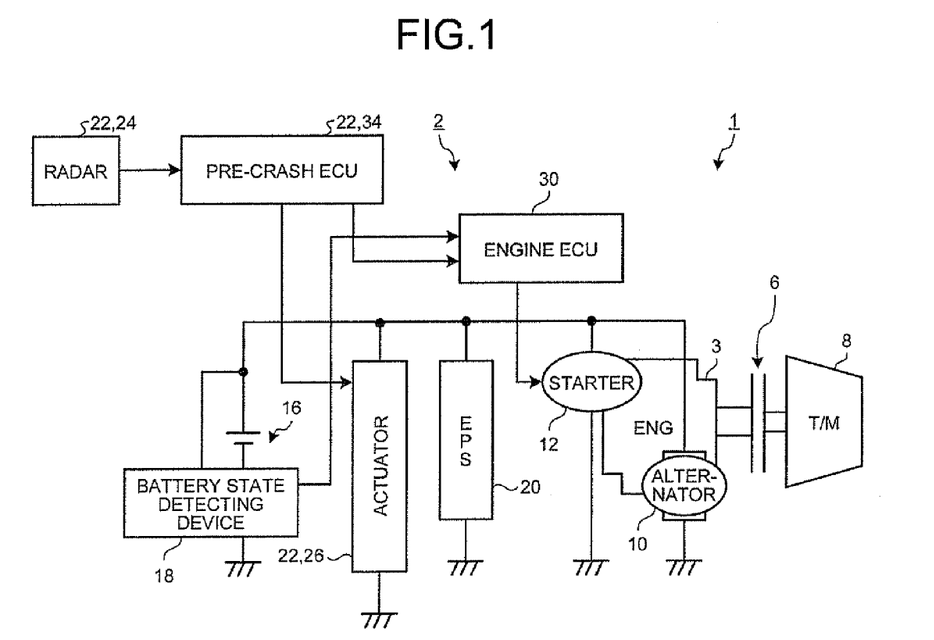
FIG. 1 is a schematic diagram of a vehicle providing a vehicle travel control device according to a first embodiment.

FIG. 1 is a schematic diagram of a vehicle providing a vehicle travel control device according to a first embodiment. As illustrated in the figure, a vehicle 1 providing a vehicle travel control device 2 according to the first embodiment provides an engine 3, which is an internal combustion, as a power source at the time of travelling, which engine 3 is coupled to a transmission 8 with steps by way of a clutch 6. The transmission 8 is coupled to a drive wheel (not illustrated) by way of a power transmission path such as a drive shaft (not illustrated).

The engine 3 provides an alternator 10, which is a power generation device for generating electricity to be used in each electrical device of the vehicle 1. The alternator 10 is activated by the power generated by the engine 3 at the time of operation of the engine 3 to generate power, where the electricity generated by the alternator 10 is not only supplied to the electrical device of the vehicle 1 but also to a battery 16, which is a power accumulation means mounted on the vehicle 1. The battery 16 charges the electricity supplied from the alternator 10 to accumulate the electricity, and also supplies the accumulated electricity to each electrical device. Each electrical device of the vehicle 1 is activated by the electricity supplied from the alternator 10 and the battery 16. Connected to the battery 16 is a battery state detecting device 18, which is a power accumulation means state detecting means, for detecting the state of the battery 16 such as the current and voltage flowing from the battery 16, the temperature of the battery 16, and the like.

The engine 3 provides a starter 12, which is an internal combustion starting means, capable of starting the engine by inputting rotation torque to a crankshaft (not illustrated) of the engine 3 when the engine 3 is stopped. The starter 12 is provided by an electric motor that is activated by the electricity supplied from the battery 16, and a transmission mechanism for transmitting the power generated by the electric motor to the engine 3. The starter 12 provided in such manner transmits the power generated by the electric motor when the electric motor is activated with the electricity from the battery 16 from the transmission mechanism to the crankshaft of the engine 3 in a stopped state to rotate the crankshaft, thus starting the engine 3.

The vehicle 1 includes an EPS (Electric Power Steering) 20, which is an electric power steering device. When activated by electricity, the EPS 20 generates an assist torque when a driver carries out a steering operation to assist the steering operation.

The vehicle 1 includes a pre-crash safety system (PCS) 22 to protect the passenger at the time of travelling of the vehicle 1. The PCS 22 includes a radar 24, which is a forward situation detecting means, for detecting a leading vehicle travelling in front of the vehicle 1, an obstacle positioned in the travelling direction, and the like, and an actuator 26, which is a vehicle maintenance device, for enhancing the safety at the time of travelling of the vehicle 1. The actuator 26 is provided as a passenger protecting device capable of protecting the passenger of the vehicle 1 when there is a possibility the vehicle 1 may collide with the leading vehicle. Such actuator 26 that also serves as the passenger protecting device may be an actuator used for a brake assist of assisting the braking force with respect to a braking operation of the driver, a seatbelt winding motor that performs the winding operation of the seatbelt, and the like. The radar 24 may be in any form as long as it is a radar that can be mounted on the vehicle 1 such as a laser radar that uses laser as a detection wave, a millimeter-wave radar that uses millimeter-wave, and the like.

The EPS 20, the actuator 26, and also the starter 12 are provided so as to be operable by electricity, and the electricity generated by the alternator 10 can be charged in the battery 16. Thus, the alternator 10 and the battery 16 are electrically connected, and the starter 12, the EPS 20, and the actuator 26 are also electrically connected to the alternator 10 and the battery 16.

Each mechanism and device arranged in such manner are connected to the vehicle 1, and the vehicle 1 is mounted with an ECU (Electronic Control Unit) for controlling each unit of the vehicle 1. The hardware configuration of the ECU that can control each unit is a known configuration including a processing unit with a CPU (Central Processing Unit), and the like, a storage unit such as RAM (Random Access Memory), and the like, and thus the description will be omitted.

For the ECU, an engine ECU 30, which carries out operation control of the engine 3, and a pre-crash ECU 34, which carries out control of the PCS 22, are arranged, for example, where among the devices of the vehicle 1, the engine 3 and the starter 12 are connected to the engine ECU 30, and the radar 24 and the actuator 26 are connected to the pre-crash ECU 34. The engine ECU 30 and the pre-crash ECU 34 are connected to each other so that information and signals can be exchanged.

The vehicle travel control device 2 according to the first embodiment has the configuration described above, and the effects thereof will now be described below. At the time of travelling of the vehicle 1, the engine ECU 30 performs the operation control of the engine 3 based on an acceleration opening, which is an operation amount of the acceleration pedal (not illustrated) operated by the driver. When performing the operation control of the engine 3, the engine ECU 30 generates a power corresponding to the acceleration opening with respect to the engine 3 by adjusting the opening of a throttle valve (not illustrated) or a fuel injection amount, or adjusting an ignition timing in the case of a spark-ignited engine 3 based on the acceleration opening.

At the time of travelling of the vehicle 1, the driver switches the gear changing step of the transmission 8 and selects an arbitrary gear changing step so that change gear ratio of the transmission 8 becomes the change gear ratio suited for the vehicle speed. The power generated by the engine 3 according to the request of the driver is thus transmitted to the transmission 8 via the clutch 6, gear changed at the change gear ratio of the gear changing step selected by the driver in the transmission 8, and then transmitted to the drive wheels through the power transmission path such as the drive shaft. The drive wheels receiving the power generated by the engine 3 generate the drive force by such power, so that the vehicle 1 travels by such drive force.

When changing the advancing direction at the time of travelling of the vehicle 1, the advancing direction is changed when the driver performs the driving operation of steering carried out using a steering wheel (not illustrated). If the driver carries out the operation of steering, the rotation torque generated by such operation is input to the EPS 20. The EPS 20 is activated by the electricity charged in the battery 16 or the electricity generated by the alternator 10 to generate the assist torque with respect to the rotation torque generated by the steering operation of the driver and output the same to the steering wheel to have the direction of the steering wheel as the direction corresponding to the steering operation of the driver.

The vehicle 1 includes the PCS 22 controlled by the pre-crash ECU 34, which PCS 22 is activated on a constant basis during the travelling of the vehicle 1. Describing the operation of the PCS 22, during the travelling of the vehicle 1, the forward situation is always detected by the radar 24, and the acquired information of the front of the vehicle 1 is acquired by the pre-crash ECU 34. In the pre-crash ECU 34, whether the possibility of colliding with the leading vehicle, or the like is high is determined based on the acquired information on the forward situation of the vehicle 1, the information such as the vehicle speed detected by a vehicle speed sensor (not illustrated) for detecting the vehicle speed, and the like.

When the possibility of collision is determined, and determination is made that the possibility of colliding with the leading vehicle, and the like is high in the pre-crash ECU 34, the pre-crash ECU 34 activates each actuator 26 that can be controlled by the pre-crash ECU 34 to perform control of protecting the passenger. For example, a control signal may be transmitted to the actuator 26 capable of outputting audio with respect to a speaker (not illustrated) installed in the vehicle and alarm may be output from the speaker so that the passenger of the vehicle 1 such as the driver can be notified that the possibility of collision is high.

When the driver steps on the brake pedal (not illustrated) and generates the braking force to avoid the collision with the leading vehicle and the like, the control signal is transmitted to the actuator 26 capable of assisting the stepping force input to the brake pedal. Thus, when the driver performs the braking operation, a larger braking force is generated compared to the braking force at the normal time with respect to the stepping force in the braking operation.

If the possibility of colliding with the leading vehicle and the like becomes higher, the seatbelt winding motor arranged as the actuator 26 is activated to wind the seatbelt. The passenger thus becomes more closely attached to the seat, and the protection performance of the passenger of when the possibility the vehicle 1 will collide is high becomes higher. When carrying out the pre-crash safety control, which is the control of the PCS 22, by the pre-crash ECU 34, the actuator 26 that is activated by electricity is controlled to enhance the safety of when the possibility of colliding with the leading vehicle is high.

In the vehicle 1, if determined that the driver does not have the intention to accelerate the vehicle 1, a so-called free-run in which the transmission path of the torque between the engine 3 and the drive wheel is separated, and the operation of the engine 3 is stopped to cause the vehicle 1 to travel through inertia using inertia energy is carried out. The control of free-run is carried out by the engine ECU 30, and is carried out when determination is made that the driver does not have the intention to accelerate the vehicle 1 and the operation state of the engine 3 satisfies a predetermined condition.

The determination on whether or not the driver has the intention to accelerate the vehicle 1 in the determination of free-run is made based on, for example, the connection state of the clutch 6 and the selection state of the transmission 8. Specifically, determination is made to carry out the free-run if the clutch 6 is in a disconnected state and the selection state of the transmission 8 is a neutral position, which is a state in which none of the gear changing step is selected; if the transmission 8 is at the neutral position and the engine rotation number is smaller than or equal to a predetermined rotation number set in advance; or if the clutch 6 is in the disconnected state and the engine rotation number is smaller than or equal to a predetermined rotation number set in advance.

The connection state of the clutch 6 in making the determination is detected by a clutch sensor (not illustrated) for detecting the operation state of the clutch pedal (not illustrated) that can perform the switching operation of the connected state and the disconnected state of the clutch 6, and the selection state of the transmission 8 is detected by a shift sensor (not illustrated) for detecting the operation state of a shift lever (not illustrated) capable of selecting the gear changing step of the transmission 8.

If determined to perform the free-run since the predetermined condition is satisfied, the engine ECU 30 stops the fuel injection control and the ignition control to stop the operation of the engine 3. In this case, since the transmission 8 is at the neutral position or the clutch 6 is in the disconnected state, the drive wheels and the engine 3 are in a state the transmission of the torque is shielded. Since the resistance that is generated by rotating the engine 3 that does not generate power is not generated, the vehicle 1 continues the inertia travelling by the motion energy based on the vehicle speed of when the free-run is started in a state the travelling resistance is reduced.

When performing the free-run, if the driver stops the driving operation when determined to perform the free-run or if the driver steps on the acceleration pedal so that determination is made that the driver has an intention to stop the free-run or an intention to accelerate, the free-run is stopped. When stopping the free-run, the engine ECU 30 activates the starter 12. In this case, the starter 12 is activated by the electricity charged in the battery 16 to crank the engine 3. The engine ECU 30 starts the engine 3 by supplying fuel to the engine 3 or adjusting the ignition timing while activating the starter 12 and cranking the engine 3.

When starting the engine 3 while performing the free-run, that is, when starting the engine 3, the engine 3 is started by activating the starter 12 with the electricity charged in the battery 16, but electrical devices other than the starter 12 are also arranged in the vehicle 1. While the engine 3 is stopped, such electrical devices are all activated by the electrically supplied from the battery 16, similar to the starter 12. Thus, when starting the engine 3 at the time of free-run, the power for activating the starter 12 and the power used by the electrical devices are required, and the battery 16 needs to provide all such powers. In other words, if the electricity cannot be supplied from the battery 16 at the time of starting of the engine 3 when performing the free-run, the stopping of the engine 3 is prohibited.

Figure 2:
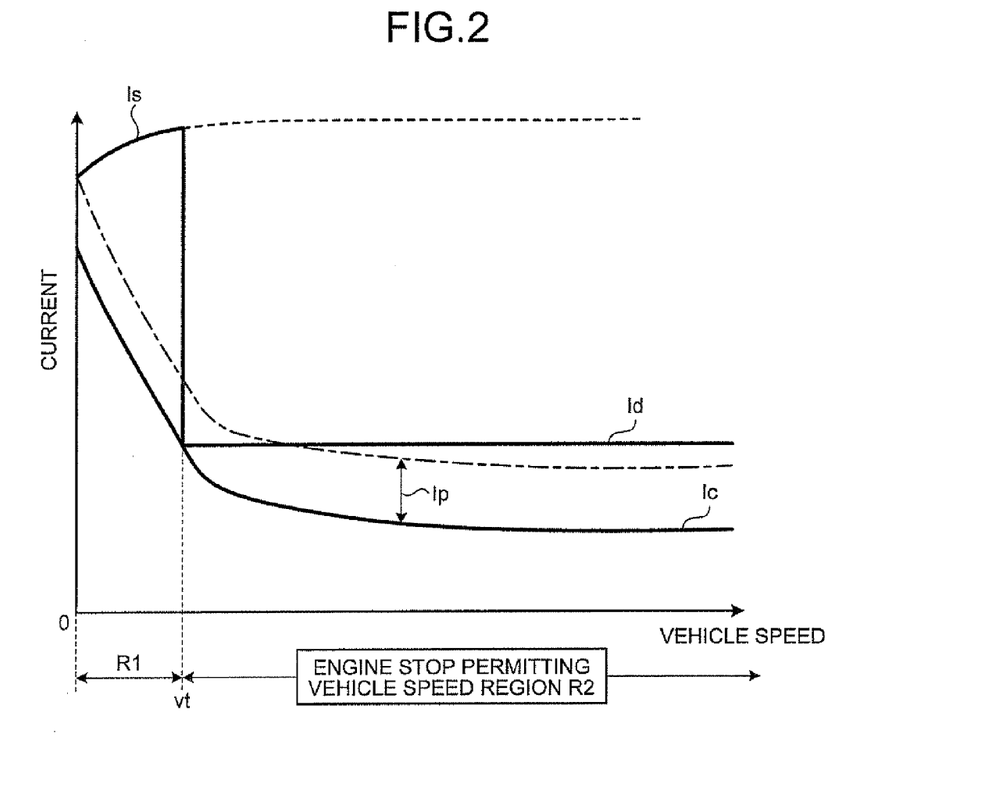
FIG. 2 is an explanatory diagram for a vehicle speed region of permitting stopping and prohibiting stopping of an engine.

FIG. 2 is an explanatory diagram of a vehicle speed region for permitting the stopping and prohibiting the stopping of the engine. The travel state of in permitting or prohibiting the stopping of the engine 3 during the travelling of the vehicle 1 will be described. When starting the stopped engine 3, if the total value of the usage power including the power to activate the starter 12 is less than the power that can be supplied by the battery 16, the stopping of the engine 3 can be permitted. If the total value of the usage power is larger than the power that can be supplied by the battery 16, the stopping of the engine 3 is prohibited. Specifically, since the electrical device in which the power consumption amount is relatively large among the plurality of electrical devices is the EPS 20, the region of permitting or prohibiting the stopping of the engine 3 is set based on the power consumption amount of the EPS 20 and the power consumption amount of the starter 12.

The maximum current for every vehicle speed in the power consumed by the EPS 20, that is, the current flowing to the EPS 20 is proportional to the magnitude of the assist torque generated in the EPS 20. The resistance with respect to the steering operation at the time of steering is large when the vehicle speed is low and becomes smaller as the vehicle speed becomes higher, and hence the assist torque generated by the EPS 20 is also large when the vehicle speed is low and becomes smaller as the vehicle speed becomes higher. Thus, similarly for the maximum current flowing to the EPS 20, the amount that flows becomes large when the vehicle speed is low and the amount that flows becomes smaller as the vehicle speed becomes higher.

On the other hand, since the current that flows to the starter 12 when activating the starter 12 is constant regardless of the vehicle speed, the maximum consumption current Ic, which is the sum of the maximum current flowing to the EPS 20 and the current flowing to the starter 12, is large when the vehicle speed is low and becomes smaller as the vehicle speed becomes higher, similar to the maximum current flowing to the EPS 20.

A battery maximum current Id, which is the maximum current that can be output from the battery 16, is constant regardless of the vehicle speed, and the condition to start the stopped engine 3 is that the battery maximum current Id is larger than or equal to the maximum consumption current Ic.

Thus, the region in which the stopping of the engine 3 can be permitted is a region in which the battery maximum current Id is larger than or equal to the maximum consumption current Ic. Specifically, the maximum consumption current Ic becomes larger as the vehicle speed becomes lower, and thus the maximum consumption current Ic becomes larger than the battery maximum current Id when the vehicle speed is smaller than or equal to a predetermined vehicle speed vt. Thus, with such vehicle speed vt at which the magnitude relationship of the maximum consumption current Ic and the battery maximum current Id is interchanged as the boundary, the vehicle speed region lower than or equal to the vehicle speed vt becomes an engine stop prohibiting vehicle speed region R1 in which the stopping of the engine 3 is prohibited, and the vehicle speed region larger than the vehicle speed vt becomes an engine stop permitting vehicle speed region R2 in which the stopping of the engine 3 is permitted. The free-run is carried out when the executing condition of the free-run is satisfied while the vehicle speed is within the engine stop permitting vehicle speed region R2, and the engine 3 is not stopped and the free-run is not carried out when the vehicle speed is within the engine stop prohibiting vehicle speed region R1 even if the executing condition of the free-run is satisfied.

The battery maximum current Id barely changes according to the vehicle speed, but changes by the ambient temperature of the battery 16, the charging state of the battery 16, and the degradation state of the battery 16. The engine ECU 30 detects the current battery maximum current Id from the detection result in the battery state detecting device 18 for detecting the current and the like flowing from the battery 16, and sets the engine stop prohibiting vehicle speed region R1 and the engine stop permitting vehicle speed region R2 according to the detected battery maximum current Id.

In the engine stop prohibiting vehicle speed region R1, the engine 3 continues to operate during the travelling of the vehicle 1, and hence the power can be generated with the alternator 10. Thus, the current that can be supplied to each electrical device is the sum of the maximum current that can be generated by the alternator 10 and the battery maximum current Id. Since the alternator 10 generates power with the power generated by the engine 3, the power generation amount becomes larger as the power generated by the engine 3 becomes larger, and the power generation amount is larger in the high speed region than in the low speed region of the vehicle speed. Therefore, a maximum supply current Is, which is the sum of the maximum current that can be generated by the alternator 10 and the battery maximum current Id, is larger in the high speed region than in the low speed region of the vehicle speed. The maximum supply current Is is larger than the maximum consumption current Ic, and thus the electrical devices including the EPS 20 are appropriately activated in the engine stop prohibiting vehicle speed region R1 in which the maximum consumption current Ic becomes large.

The engine stop prohibiting vehicle speed region R1 and the engine stop permitting vehicle speed region R2 at time of normal travelling of the vehicle 1 are set based on the relationship of the battery maximum current Id and the maximum consumption current Ic as described above, and thus the executable operation region of the free-run is set by the vehicle speed, where the actuator 26 of the PCS 22 is activated if an obstacle having a high possibility of collision is detected by the PCS 22. Since the actuator 26 is activated by electricity, similar to the EPS 20, and the like, the consumption current easily becomes high. Thus, if an obstacle is detected by the PCS 22, the region to permit the stopping and the region to prohibit the stopping of the engine 3 are set by also taking into consideration the consumption current in the actuator 26.

Figure 3:
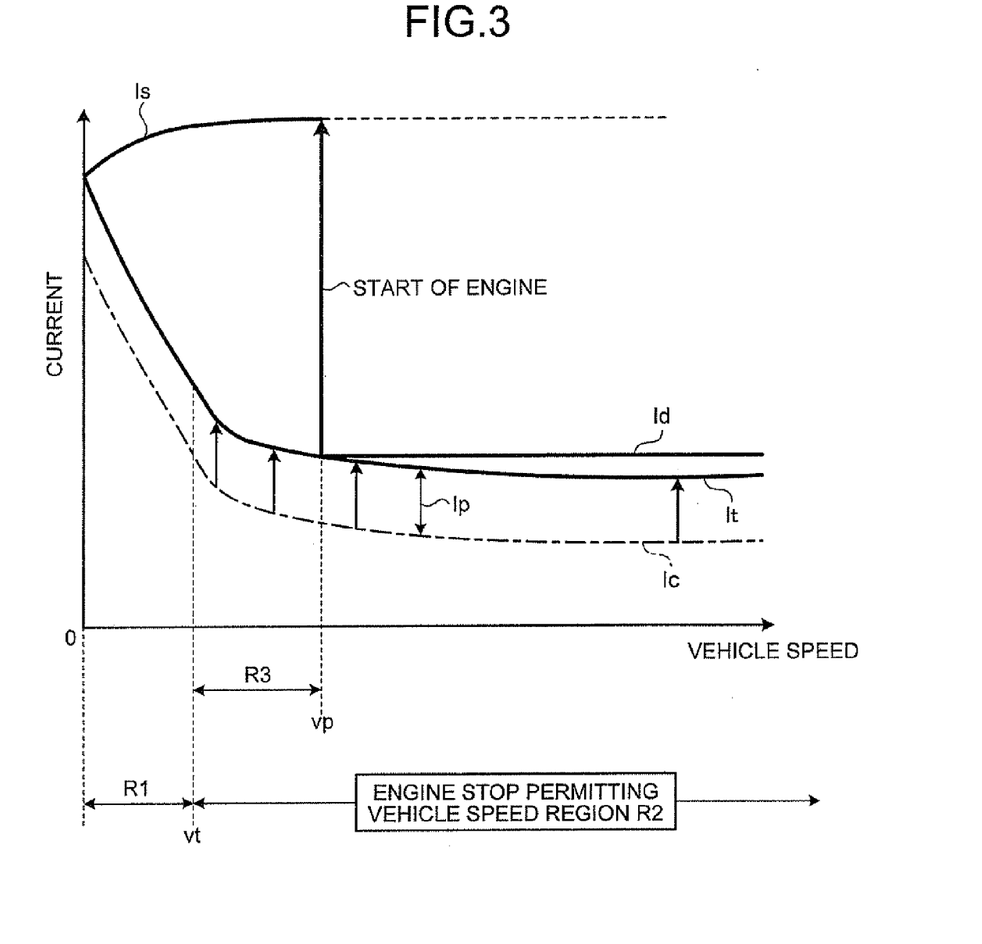
FIG. 3 is an explanatory diagram for a vehicle speed region of permitting stopping and prohibiting stopping of the engine when there is a possibility of collision.

FIG. 3 is an explanatory diagram for a vehicle speed region of permitting the stopping and prohibiting the stopping of the engine when there is a possibility of collision. Describing the travel state of in permitting and prohibiting the stopping of the engine 3 when the PCS 22 determines that there is a possibility of colliding with the obstacle, each actuator 26 of the PCS 22 is activated based on the detection result of the radar 24 in the PCS 22. Thus, the actuator 26 exists in plurals, and the actuator 26 to be activated differs depending on how high the possibility of colliding with the obstacle is and the driving operation of the driver. Thus, if the possibility of colliding with the obstacle such as the leading vehicle is detected based on the detection result in the radar 24, the region of permitting or prohibiting the stopping of the engine 3 is set based on a pre-crash maximum consumption current It, which is a current obtained by adding a pre-crash equipped current Ip which is the maximum current consumed in the actuator 26 of the PCS 22, to the maximum consumption current Ic.

The pre-crash equipped current Ip has substantially a constant magnitude regardless of the vehicle speed, and thus the pre-crash maximum consumption current It, in which the pre-crash equipped current Ip is added to the maximum consumption current Ic becomes a current having the same characteristics as the maximum consumption current Ic. That is, similar to the maximum consumption current Ic, the pre-crash maximum consumption current It becomes large when the vehicle speed is low and becomes smaller as the vehicle speed becomes higher, and the current value becomes large over the entire region with respect to the maximum consumption current Ic.

If determined that there is a possibility of colliding with the obstacle, the battery maximum current Id needs to be larger than the pre-crash maximum consumption current It in order to start the engine 3 in the stopped state while ensuring the activation of the actuator 26 of the PCS 22. In other words, if determined that there is a possibility of colliding with the obstacle, the stopped engine 3 can be started in the region where the battery maximum current Id is larger than the pre-crash maximum consumption current It regardless of the activation state of the actuator 26 of the PCS 22.

The current values of the pre-crash maximum consumption current It and the maximum consumption current Ic become smaller as the vehicle speed becomes higher, and the pre-crash maximum consumption current It has a larger current value overall with respect to the maximum consumption current Ic. Thus, the vehicle speed at which the battery maximum current Id and the pre-crash maximum consumption current It intersect and the battery maximum current Id becomes larger than the pre-crash maximum consumption current It is the vehicle speed faster than the vehicle speed at which the battery maximum current Id becomes larger than the maximum consumption current Ic.

Therefore, the vehicle speed region from the vehicle speed vt, where the battery maximum current Id and the maximum consumption current Ic intersect, to the vehicle speed vp, where the battery maximum current Id and the pre-crash maximum consumption current It intersect, in the engine stop permitting vehicle speed region R2 is an engine start vehicle speed region R3, which is a vehicle speed region in which the engine 3 needs to be started. That is, the engine start vehicle speed region R3 is a vehicle speed region in which the engine 3 needs to be started before the activation of the actuator 26 of the PCS 22 when determined that there is a possibility of colliding with the obstacle when the engine 3 is stopped.

Thus, if determined that there is a possibility of colliding with the obstacle when the engine 3 stopped and the free-run is being carried out at the vehicle speed within the engine start vehicle speed region R3, the engine 3 is started. When the engine 3 is started, the alternator 10 is also activated so that the alternator 10 generates power, and hence the current that can be supplied to each electrical device becomes the maximum supply current Is. Therefore, the current that can be supplied to each electrical device can be larger than or equal to the pre-crash maximum consumption current It, and a state in which the actuator 26 of the PCS 22 can be activated by the electricity supplied from the alternator 10 and the battery 16 is obtained.

Therefore, if determined that there is a possibility of collision in the middle of carrying out the free-run, the engine 3 is started when the vehicle speed is the vehicle speed within the engine start vehicle speed region R3 to ensure the activatable state of the actuator 26. In other words, if the activation of the actuator 26 of the PCS 22 is predicted by the determination that there is a possibility of collision in the middle of carrying out the free-run, the engine 3 is started.

Therefore, when the actuator 26 of the PCS 22 is activated when the free-run is being carried out, the actuator 26 needs to be activated after operating the engine 3 and causing the alternator 10 to start the power generation. Thus, when the actuator 26 of the PCS 22 is activated while the engine 3 is stopped and the free-run is carried out, the engine 3 is started before the actuator 26 is activated.

Figure 4:
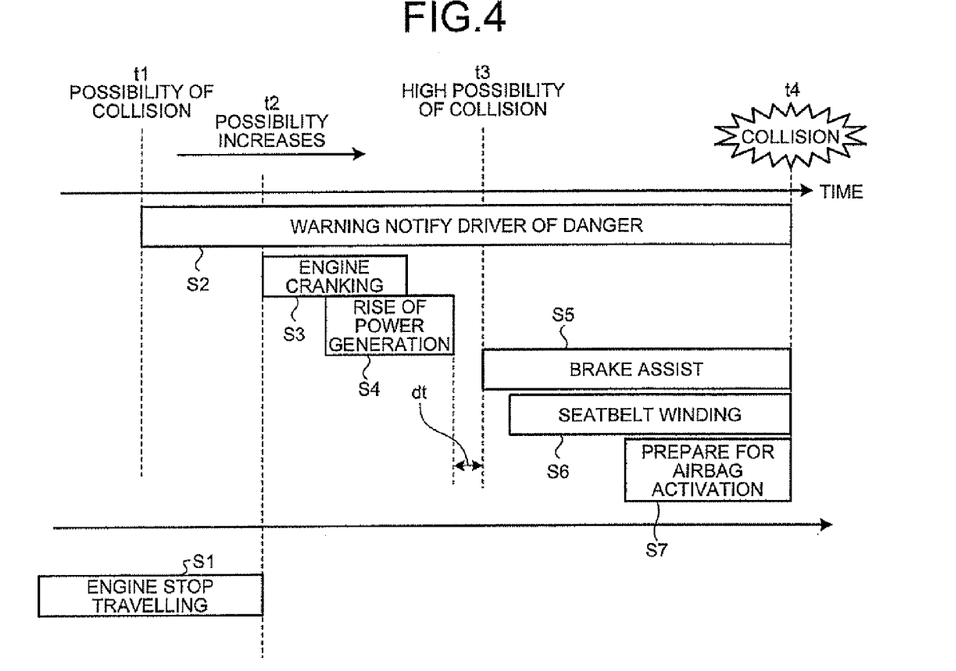
FIG. 4 is a time chart at the time of pre-crash safety control.

FIG. 4 is a time chart at the time of pre-crash safety control. If determined that there is a possibility of colliding with the obstacle when the engine 3 is stopped and the free-run is being carried out at the vehicle speed within the engine start vehicle speed region R3, the engine 3 is started in such manner. The pre-crash safety control of when carrying out the free-run will now be described below in time-series.

If determined by the pre-crash ECU 34 that there is a possibility of colliding with the obstacle (t1) from the detection result of the radar 24 while travelling with the engine 3 stopped (S1), the pre-crash ECU 34 outputs an alarm from a speaker installed in the vehicle (S2). This notifies the driver of the danger. Furthermore, if determined that there is a possibility of colliding with the obstacle, the engine ECU 30 activates the starter 12 and starts the cranking of the engine 3 (t2, S3). When the cranking of the engine 3 is performed, the alternator 10 is also activated, and hence the power generation by the alternator 10 also rises (S4).

If the possibility of collision is increased and the possibility of collision becomes high (t3) after being determined that there is a possibility of colliding with the obstacle, the driver performs the braking operation to avoid the collision, and the pre-crash ECU 34 performs the brake assist on the braking operation (S5). In other words, the pre-crash ECU 34 activates the actuator 26 to use in the brake assist.

In order to reliably activate the actuator 26, the current supplied by the alternator 10 and the battery 16 needs to be larger than or equal to the pre-crash maximum consumption current It, but if the cranking of the engine 3 is performed to generate power, the power generation may not stabilize in the rising period (S4) of power generation and the generated current may be unstable or may not be a predetermined current value. Thus, when reliably activating the actuator 26 to use in the pre-crash safety control such as performing the brake assist (S5), the actuator 26 needs to be activated after the rising period (S4) of power generation in the alternator 10 is terminated and the state in which the power generation in the alternator 10 can be reliably carried out is obtained.

Therefore, to ensure the activation performance of the actuator 26 by generating power in the alternator 10 while there is a possibility of colliding with the obstacle when carrying out free-run at the vehicle speed within the engine start vehicle speed region R3, control is performed such that the time of termination of the rising period (S4) of power generation by the alternator 10 reliably becomes earlier than the time of start of activation of the actuator 26. That is, the control of power generation of the alternator 10 and the activation of the actuator 26 is carried out so that a time interval (dt) produces including variation in the rising period of power generation between the time of termination of the rising period (S4) of power generation by the alternator 10 and the time of start of activation of the actuator 26.

If the possibility of collision with the obstacle does not reduce, the actuator 26 used in the pre-crash safety control is also activated. For example, the seatbelt winding motor is activated to wind the seatbelt (S6), or preparation to activate the air bag is performed (S7).

If collision eventually occurs (t4) even if the pre-crash safety control is performed such as the brake assist is performed on the braking operation, the passenger held at the seat by the seatbelt wound by the seatbelt winding motor is less likely to be thrown out from the seat, and the air bag is immediately activated since the air bag is prepared to be activated. The protection on the passenger even at the time of collision is thus enhanced.

If the activation of the actuator 26 of the PCS 22 is predicted by determining that there is a possibility of colliding with the obstacle at the time of normal travelling of the vehicle 1, that is, during the travelling of the vehicle 1, which travels by the power generated by the engine 3, the engine ECU 30 stops the engine 3 and prohibits the free-run.

That is, if the actuator 26 of the PCS 22 is activated when the engine 3 is stopped causing the vehicle to perform the free-run, the engine 3 sometimes needs to be started by vehicle speed to ensure the current for activating the actuator 26. Specifically, if the vehicle speed during the free-run is within the engine start vehicle speed region R3, the engine 3 needs to be started before activating the actuator 26. Thus, to suppress the engine 3 from again starting after the stopping of the engine 3, the engine 3 is prohibited from being stopped before the actuator 26 is activated and causing the vehicle to perform the free-run in a situation where the actuator 26 of the PCS 22 is activated while the vehicle 1 is travelling with the power generated by the engine 3.

The vehicle travel control device 2 stops the engine 3 and performs the free-run if determined that the driver does not have the intention to accelerate the vehicle 1 during the travelling of the vehicle 1 that is travelling by the power generated by the engine 3. The fuel consumption amount at the time of travelling of the vehicle 1 thus can be reduced. Furthermore, if the activation of the actuator 26 of the PCS 22 is predicted by detecting the obstacle such as the leading vehicle with the radar 24 when performing the free-run, the engine 3 is started to generate power in the alternator 10 thus increasing the supply amount of electricity. The activation of the device which is activated by electricity and which enhances the protection performance of the passenger of the vehicle 1 such as the actuator 26 for performing the brake assist can be ensured, and the reliability of maintenance operation, which is the operation of enhancing the protection performance of the passenger, can be enhanced. As a result, the improvement of fuel economy at the time of travelling of the vehicle and the maintenance operation can be more reliably achieved.

When the actuator 26 of the PCS 22 is activated while the free-run is carried out to reduce the fuel consumption amount, the engine 3 is started before the actuator 26 is activated. At the start of activation of the actuator 26, the electricity necessary for activating actuator 26 is reliably generated by the alternator 10 that is activated by the power of the engine 3 to generate power, and supplied to the actuator 26. Therefore, even if in a situation where the protection performance of the passenger needs to be enhanced while the free-run is carried out, the maintenance operation that enhances the protection performance of the passenger can be more reliably carried out by the actuator 26. As a result, improvement of fuel economy at the time of travelling of the vehicle and maintenance operation can be more reliably achieved.

If determination can be made that the driver does not have the intention to accelerate when operating the engine 3 and travelling the vehicle 1 with the power generated by the engine 3, the engine 3 is stopped and the free-run is performed, whereas the free-run is prohibited from being performed if the activation of the actuator 26 of the PCS 22 is predicted. That is, although the actuator 26 is activated by electricity, it is sometimes difficult to appropriately activate the actuator 26 with only the electricity supplied from the battery 16 depending on the driving state of the vehicle 1. Thus, if the activation of the actuator 26 of the PCS 22 is predicted, the engine 3 is prohibited from being stopped and the power generation in the alternator 10 is continued by the power of the engine 3 to ensure the electricity to supply to the electrical devices such as the actuator 26. The activation of the actuator 26 that enhances the protection performance of the passenger of the vehicle 1 thus can be ensured, and the reliability of the maintenance operation for enhancing the protection performance of the passenger can be enhanced. As a result, the improvement of fuel economy at the time of travelling of the vehicle and the maintenance operation can be more reliably achieved.

When the actuator 26 of the PCS 22 is activated while travelling the vehicle 1 with the power generated by the engine 3, the engine 3 is stopped before the actuator 26 is activated to prohibit the free-run from being performed. That is, since the actuator 26 is activated using also the electricity generated by the alternator 10 depending on the travel state of the vehicle 1, when the actuator 26 is activated, the activation of the actuator 26 can be ensured by prohibiting the stopping of the engine 3 and continuing the power generation of the alternator 10. The reliability of the maintenance operation for enhancing the protection performance of the passenger of the vehicle 1 can be enhanced. As a result, the improvement of fuel economy at the time of travelling of the vehicle and the maintenance operation can be more reliably achieved.

The actuator 26 of the PCS 22 that prioritizes the activation than the free-run capable of achieving reduction in the fuel consumption amount is arranged as a passenger protecting device that can protect the passenger of the vehicle 1 when the vehicle 1 has a possibility of colliding with an obstacle such as the leading vehicle, or the like. Thus, the passenger of the vehicle 1 can be appropriately protected even when carrying out the travel control to improve fuel economy. As a result, both the improvement of fuel economy at the time of travelling of the vehicle and the maintenance operation can be more reliably satisfied.

Furthermore, when performing the free-run, determination is made to start the engine 3 or to prohibit the stopping of the engine 3 by comparing the battery maximum current Id, which changes according to the state of the battery 16, and the pre-crash maximum consumption current It, so that the power generation can be controlled in the alternator 10 at the time of free-run according to the state of the battery 16. Thus, the reliability of the maintenance operation can be further enhanced regardless of the state of the battery 16. As a result, the maintenance operation can be more reliably carried out while improving fuel economy at the time of travelling of the vehicle.

Second Embodiment

A vehicle travel control device 40 according to a second embodiment has a configuration substantially similar to the vehicle travel control device 2 according to the first embodiment, but has a characteristic in that the control of the free-run is carried out in view of the load at the time of travelling of the vehicle 1. Other configurations are similar to the first embodiment, and thus the description will be omitted and the same reference numerals will be denoted.

Figure 5:
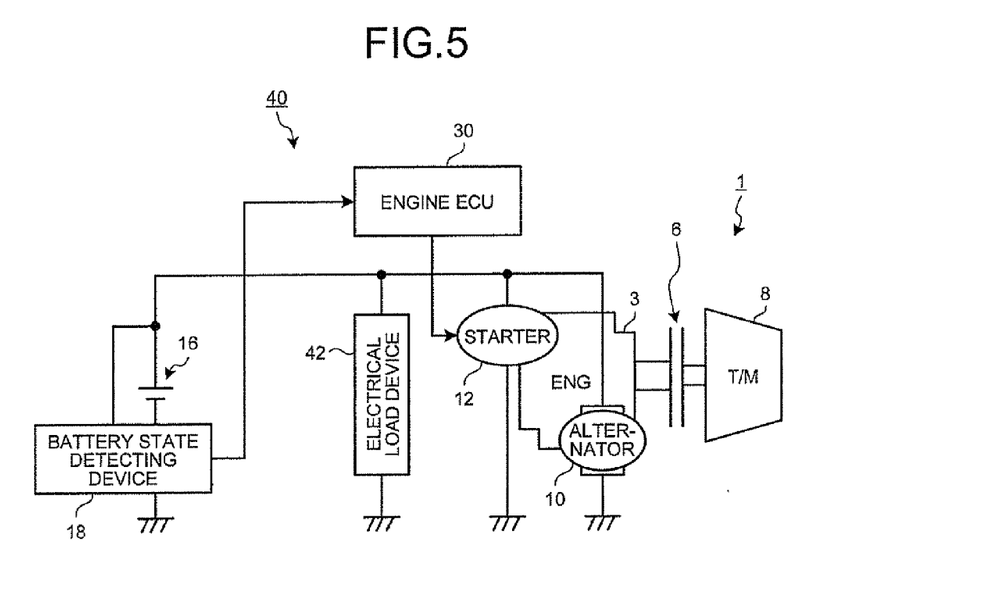
FIG. 5 is a schematic view of a vehicle providing a vehicle travel control device according to a second embodiment.

FIG. 5 is a schematic view of a vehicle providing the vehicle travel control device according to the second embodiment. The vehicle travel control device 40 according to the second embodiment is arranged in a configuration similar to the vehicle travel control device 2 according to the first embodiment, and includes the engine 3 as a power source at the time of travelling of the vehicle 1, the engine 3 being coupled to the transmission 8 by way of the clutch 6. The engine 3 includes the alternator 10 that generates power by the power generated by the engine 3, and the starter 12 that can start the engine 3. The engine ECU 30 is connected to the engine 3 provided in such manner, and the engine ECU 30 can control the power generation amount of the electricity generated by the alternator 10 and the activation of the starter 12 for starting the engine 3 other than the operation control of the engine 3.

The battery 16 is arranged other than the alternator 10 as the power supply source for supplying electricity to the electrical device used in the vehicle 1, and the battery 16 is arranged to charge the electricity generated by the alternator 10 and to be able to supply the charged electricity to the electrical device. The battery state detecting device 18 for detecting the state of the battery 16 is connected to the battery 16 arranged in such manner.

On a path through which the electricity output from the alternator 10 and the battery 16 flows, an electrical load device 42, which is an electrical device activated by electricity is arranged in plurals. The electrical load device 42 is arranged as a vehicle maintenance device for ensuring the safety at the time of travelling of the vehicle 1, and motors of the EPS 20 (see FIG. 1) and the like activated by electricity, ECUs such as the engine ECU 30, lights such as the headlight that is lighted when electricity is supplied, and the like are arranged, for example, as the electrical load device 42. Such electrical load devices 42 use the electricity when being activated or lighted to apply an electrical load on the alternator 10 and the battery 16, which are power supply sources.

The vehicle travel control device 40 according to the second embodiment has the configuration described, and the effects will be described below. At time of normal travelling of the vehicle 1, the engine 3 is controlled by the engine ECU 30 according to the acceleration opening, and the vehicle travels by generating power in the engine 3. If determined that the driver does not have an intention to accelerate the vehicle 1 during the travelling of the vehicle 1, the engine 3 is stopped to carry out the free-run. The engine 3 is stopped during the free-run, but the electrical load device 42 is activated similar to time of normal traveling even during the free-run.

Thus, the electricity for activating the electrical load device 42 is required even during the free-run, but the electricity used to activate the electrical load device 42 is supplied only from the battery 16 since the engine 3 is stopped and the alternator 10 is also stopped during the free-run. Therefore, an electricity amount that can be supplied may become insufficient with only the electricity supplied from the battery 16 depending on the activation state of the electrical load device 42 while the free-run is being carried out. That is, while the free-run is being carried out, the load current, which is the current necessary for activating the electrical load device 42, sometimes becomes larger than the current that can be output from the battery 16, in which case, the engine 3 is operated.

Figure 6:
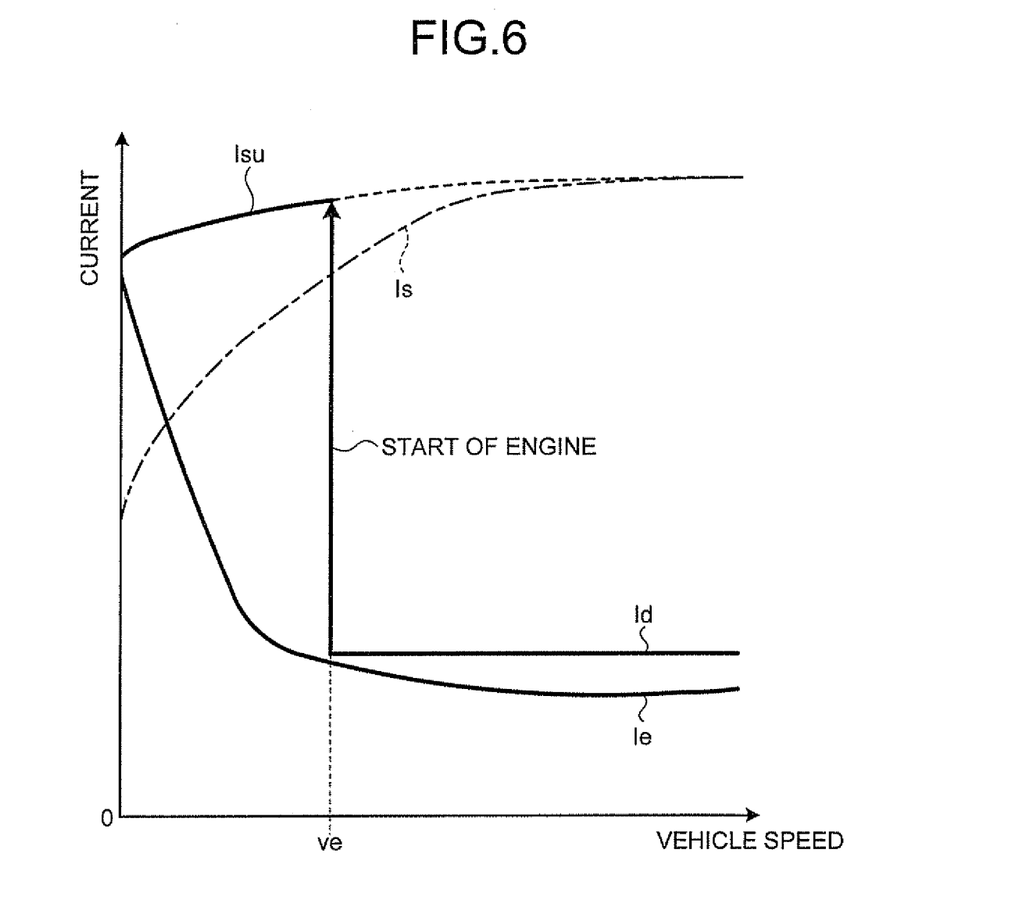
FIG. 6 is an explanatory diagram illustrating a relationship between a supply current including the power generation amount in the alternator and a load current.

FIG. 6 is an explanatory diagram illustrating a relationship of the supply current including the power generation amount in the alternator and the load current. Since the alternator 10 does not generate power while the engine 3 is stopped by performing the free-run, the load current Ie needs to be provided by the battery maximum current Id. Thus, when performing the free-run, the battery maximum current Id needs to be larger than the load current Ie. The battery maximum current Id is constant regardless of the vehicle speed, but the load current Ie sometimes changes according to the vehicle speed.

For example, the electrical load device 42 includes the motor of the EPS 20, where the EPS 20 has a large consumption current when the vehicle speed is low and lesser consumption current as the vehicle speed becomes higher. Thus, the load current Ie is also larger when the vehicle speed is low rather than when the vehicle speed is high, and the load current Ie may become larger than or equal to the battery maximum current Id when the vehicle speed is lowered while performing the free-run. Therefore, if predicted that the load current Ie will become larger than or equal to the battery maximum current Id, the starter 12 is controlled by the engine ECU 30 to activate the starter 12 and start the engine 3 to generate power in the alternator 10 and appropriately activate the electrical load device 42.

In other words, the engine 3 is started when the actual vehicle speed during the free-run lowers to the vehicle speed ve at which the load current Ie, which becomes larger as the vehicle speed becomes lower, is predicted to be larger than or equal to the battery maximum current Id. Thus, the engine 3 is started before the electrical load device 42 is activated in a state the load current Ie is larger than or equal to the battery maximum current Id.

When the load current Ie becomes larger, and the load current Ie becomes large to a magnitude of larger than or equal to the current value at which the power can be generated in the alternator 10 while the engine 3 is performing idle rotation, the rotation number of the engine 3 is increased to increase the power generation amount in the alternator 10. In other words, when the load current Ie becomes larger than the maximum supply current Is in the current operation state, the rotation number of the engine 3 is increased to increase the power generation amount in the alternator 10.

Figure 7:
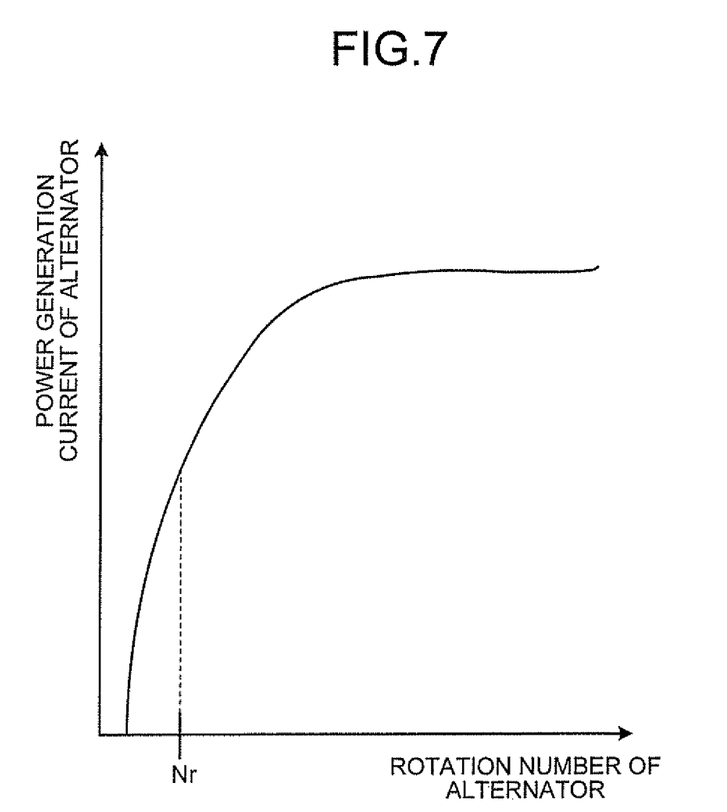
FIG. 7 is an explanatory diagram illustrating a relationship between a rotation number of the alternator and current generated by the alternator.

FIG. 7 is an explanatory diagram illustrating a relationship between the rotation number of the alternator and the current generated in the alternator. Describing the relationship between the rotation number and the power generation amount of the alternator 10, the alternator 10 generates power when a part of the power generated by the engine 3 is transmitted as a rotation torque and the rotating body rotates by such rotation torque, where the power generation amount in this case becomes larger as the rotation number of the rotating body becomes higher. That is, the current generated in the alternator 10 becomes larger as the rotation number of the alternator 10 becomes higher.

Thus, when increasing the current to be generated in the alternator 10, the current to generate is increased by having the rotation number higher than the rotation number Nr of the alternator 10 at time of normal idle rotation of the engine 3. In other words, when generating in the alternator 10 the current larger than or equal to the current generated when the alternator 10 rotates at the rotation number Nr at time of normal idle rotation of the engine 3, the rotation number of the alternator 10 is made higher than the rotation number Nr.

When the load current Ie becomes larger, and the load current Ie becomes larger than the maximum supply current Is in the current operation state, the rotation number of the engine 3 is increased and the power generation amount in the alternator 10 is increased to increase the maximum current that is output from the alternator 10 and the battery 16 and that can be supplied to the electrical load device 42. That is, if the load current Ie is larger than the maximum supply current Is, the power generation amount in the alternator 10 is increased to increase the maximum supply current Is, which is the total of the current that can be generated in the alternator 10 and the current that can be output from the battery 16. Thus, a power generation amount increasing supply current Isu, which is the current in which the maximum supply current Is is increased by increasing the power generation amount in the alternator 10, is made to be larger than the load current Ie.

The electrical load device 42 is appropriately activated by the power generation amount increasing supply current Isu since the load current Ie, which is the maximum consumption current of the electrical load device 42, can be provided by the power generation amount increasing supply current Isu increased with respect to the maximum supply current Is.

If the electrical load device 42 is activated while performing the free-run for reducing the fuel consumption amount, the vehicle travel control device 40 described above starts the engine 3 before the load current Ie becomes larger than or equal to the battery maximum current Id and the electrical load device 42 is activated. Thus, at time of activation of the electrical load device 42, the electricity necessary for activating the electrical load device 42 can be reliably generated by the alternator 10, which is activated by the power of the engine 3 to generate power, and supplied to the electrical load device 42. Therefore, when activating the electrical load device 42 to ensure the safety at the time of travelling of the vehicle 1 while performing the free-run, the maintenance operation for ensuring the safety can be more reliably carried out by the electrical load device 42. As a result, the improvement of the fuel economy at the time of travelling of the vehicle and the maintenance operation can be more reliably achieved.

The engine 3 provides the alternator 10 for generating power at time of operation of the engine 3, where the power generation amount in the alternator 10 is increased by raising the rotation number of the engine 3 at the start of the engine 3 when the load current Ie becomes larger than or equal to the battery maximum current Id and the electrical load device 42 is activated. The current necessary for activating the electrical load device 42 thus can be more reliably supplied to the electrical load device 42, and the electrical load device 42 can be appropriately activated. As a result, the improvement in the fuel economy at the time of travelling of the vehicle and the maintenance operation can be more reliably achieved.

The actuator 26 of the PCS 22 is used for the vehicle maintenance device in the vehicle travel control device 2 according to the first embodiment described above, and the electrical load device 42 is used for the vehicle maintenance device in the vehicle travel control device 40 according to the second embodiment, but the vehicle maintenance device used for the determination on whether or not to execute the travel control in which the engine 3 is stopped is not limited thereto. The vehicle maintenance device may be, for example, a stable travel control device that generates the braking force independently for each wheel according to the travel state at the time of travelling of the vehicle 1, prevents side skidding of the vehicle 1 by controlling the EPS 20 to control the assist torque of steering, and stabilizes the travel state at the time of travelling of the vehicle 1.

That is, the control to prevent side skidding is carried out by controlling the braking force and the steering assist when detecting side skidding with a sensor for detecting the operation state of the vehicle 1 or when side skidding is predicted from the vehicle speed or the curvature of the corner acquired from the map information of the car navigation system. Thus, when controlling the braking force and the steering assist to carry out the control to prevent side skidding, the actuators used for such control are activated, the actuators being controlled by the ECU for the stable travel control device but are activated by electricity. Thus, when stopping the engine 3 and carrying out the free-run, the engine 3 may be stopped or the stopping of the engine 3 may be prohibited according to the activation status of the stable travel control device. Thus, the stability at the time of travelling of the vehicle 1 can be ensured while improving the fuel economy at the time of travelling of the vehicle.

The vehicle maintenance device may be a purifying means heating device such as a heater, arranged on a path of exhaust gas discharged at time of operation of the engine 3, for heating a catalyst (not illustrated), which is the purifying means for purifying the exhaust gas. That is, the catalyst has a temperature region in which the exhaust can be efficiently purified, and the efficiency in purifying the exhaust gas easily lowers at the temperature lower than or equal to such temperature region. Thus, if detected or presumed that the temperature of the catalyst is lower than the temperature region, the temperature of the catalyst is raised by the purifying means heating device to maintain the temperature region in which the exhaust gas can be efficiently purified.

The purifying means heating device can raise the temperature of the catalyst, where the heater or the like arranged as the purifying means heating device is activated by electricity. Thus, when stopping the engine 3 and carrying out the free-run, the engine 3 may be stopped or the stopping of the engine 3 may be prohibited according to the activation status of the purifying means heating device. Thus, the purifying performance of the exhaust gas can be ensured while improving the fuel economy at the time of travelling of the vehicle. Furthermore, when prohibiting the stopping of the engine 3 and operating the engine 3 when the temperature of the catalyst is low and the purifying means heating device is to be activated, the temperature of the catalyst can also be raised by the exhaust gas discharged from the engine 3. The temperature of the catalyst thus can be raised quickly by the heat generated by the purifying means heating device and the heat of the exhaust gas, so that the purifying performance of the exhaust gas that lowered by the lowering of the temperature of the catalyst can be recovered more quickly.

In the vehicle travel control devices 2, 40 according to the first and second embodiments, description is made using the free-run for the travel control of stopping the engine 3 and causing the vehicle 1 to travel through inertia at the time of travelling of the vehicle 1, but the travel control of stopping the engine 3 and causing the vehicle 1 to travel through inertia at the time of travelling of the vehicle 1 may be other than the free-run. For example, the control described above may be carried out when stopping the engine 3 and causing the vehicle 1 to travel through inertia at the time of deceleration. At time of deceleration of the vehicle 1, the degree of lowering of the vehicle speed becomes faster than at time of free-run, and hence at time of stopping of the engine 3, the vehicle speed easily becomes smaller than or equal to the speed at which the pre-crash maximum consumption current It and the load current Ie become larger than the battery maximum current Id. Therefore, even when performing the control of stopping the engine 3 at time of deceleration of the vehicle 1, the engine 3 is started or the stopping of the engine 3 is prohibited if the pre-crash maximum consumption current It and the load current Ie become larger than the battery maximum current Id, so that the protection performance and the safety of the passenger at time of deceleration of the vehicle 1 can be ensured. The improvement of the fuel economy at the time of travelling of the vehicle and the maintenance operation thus can be more reliably achieved.

In the vehicle 1 including the vehicle travel control device 2, 40 according to the first and second embodiment, the transmission 8 includes a plurality of gear changing steps having different change gear ratios and is a manual transmission in which the driver manually selects an arbitrary gear changing step, but the transmission 8 may be an automatic transmission. For example, the automatic transmission with steps of switching the change gear ratio using a planetary wheel, a clutch and the like, a step-less transmission capable of switching the change gear ration in a no-step manner by using a belt, a pulley, and the like may be adopted.

Therefore, even if the transmission 8 is the automatic transmission, the transmission of torque can be shielded between the engine 3 and the drive wheel, so that the engine 3 can be stopped thus causing the vehicle to travel through inertia. Furthermore, even if the transmission 8 is the automatic transmission, the driver can arbitrarily switch the travelling range, and determination can be made that the driver has no intention of accelerating the vehicle 1 by having the travelling range as N (neutral) range, which is the range in which the power generated by the engine 3 is not transmitted to drive wheel, during the travelling of the vehicle 1. Therefore, even if the transmission 8 is the automatic transmission such as step-less transmission, the inertia travelling is carried out as necessary, and the engine 3 is started or the stopping of the engine 3 is prohibited when the pre-crash maximum consumption current It and the load current Ie become larger than the battery maximum current Id, so that the protection performance and the safety of the passenger at time of deceleration of the vehicle 1 can be ensured. The improvement of the fuel economy at the time of travelling of the vehicle and the maintenance operation thus can be more reliably achieved.

INDUSTRIAL APPLICABILITY

As described above, the vehicle travel control device according to the present invention is useful in a vehicle including an electrical device that is activated using electricity generated in the power generation device by a power generated by the power source, and in particular, suited when carrying out the control of stopping the power source and causing the vehicle to travel through inertia.

REFERENCE SIGNS LIST

1 vehicle
2, 40 vehicle travel control device
3 engine
6 clutch
8 transmission
10 alternator
12 starter
16 battery
18 battery state detecting device
20 EPS
22 pre-crash safety system
24 radar
26 actuator
30 engine ECU
34 pre-crash ECU
42 electrical load device

The invention claimed is:

1. A vehicle travel control device comprising:
a power generation device configured to generate electrical power by power generated at the time of operation;
a power source configured to provide the power generation device with power; and
a vehicle maintenance device configured to be activated by electricity, wherein:
when stopping the power source and causing a vehicle, which travels by power generated by the power source, to travel through inertia, if it is determined that an activation of the vehicle maintenance device is predicted based on a forward situation of the vehicle, the power source is started before the vehicle maintenance device is activated in response to the prediction, and the vehicle maintenance device is activated after the power generation device is activated by power generated by the power source, and
control of power generation by the power generation device and activation of the vehicle maintenance device is carried out so that a predetermined time interval is produced, the predetermined time interval being between a time of termination of a rising period of power generation by the power generation device and a start time of the activation of the vehicle maintenance device, regardless of variation in the rising period of power generation.

2. The vehicle travel control device according to claim 1, wherein
when starting the power source before activation of the vehicle maintenance device, rotation number of the power source is raised to increase power generation amount in the power generation device.

3. The vehicle travel control device according to claim 1, wherein the vehicle maintenance device is a passenger protecting device capable of protecting passengers of the vehicle when the vehicle has a possibility of colliding with an obstacle.

4. The vehicle travel control device according to claim 1, wherein the vehicle maintenance device is a safety travel control device configured to stabilize travel state at the time of travelling of the vehicle.

5. The vehicle travel control device according to claim 1, wherein the vehicle maintenance device is a purifying unit heating device configured to heat a purifying unit that purifies exhaust gas discharged at the time of operation of the power source.

6. The vehicle travel control device according to claim 2, wherein the vehicle maintenance device is a passenger protecting device capable of protecting passengers of the vehicle when the vehicle has a possibility of colliding with an obstacle.

7. The vehicle travel control device according to claim 2, wherein the vehicle maintenance device is a safety travel control device configured to stabilize travel state at the time of travelling of the vehicle.

8. A vehicle travel control device comprising:
a power generation device configured to generate electrical power by power generated at the time of operation;
a power source configured to provide the power generation device with power; and
a vehicle maintenance device configured to be activated by electricity, wherein:
when stopping the power source and causing a vehicle, which travels by power generated by the power source, to travel through inertia, if it is determined that the vehicle maintenance device will be activated, the power source is started before the vehicle maintenance device is activated in response to the determination, and the vehicle maintenance device is activated after the power generation device is activated by power generated by the power source, and
control of power generation by the power generation device and activation of the vehicle maintenance device is carried out so that a predetermined time interval is produced, the predetermined time interval being between a time of termination of a rising period of power generation by the power generation device and a start time of the activation of the vehicle maintenance device, regardless of variation in the rising period of power generation.

9. The vehicle travel control device according to claim 8, wherein when starting the power source before activation of the vehicle maintenance device, rotation number of the power source is raised to increase power generation amount in the power generation device.

10. The vehicle travel control device according to claim 8, wherein the vehicle maintenance device is a passenger protecting device capable of protecting passengers of the vehicle when the vehicle has a possibility of colliding with an obstacle.

11. The vehicle travel control device according to claim 8, wherein the vehicle maintenance device is a safety travel control device configured to stabilize travel state at the time of travelling of the vehicle.

12. The vehicle travel control device according to claim 8, wherein the vehicle maintenance device is a purifying unit heating device configured to heat a purifying unit that purifies exhaust gas discharged at the time of operation of the power source.

\* \* \* \* \*